Aug. 23, 1932. J. O. BARCE 1,873,260
VALVE
Filed Dec. 19, 1929
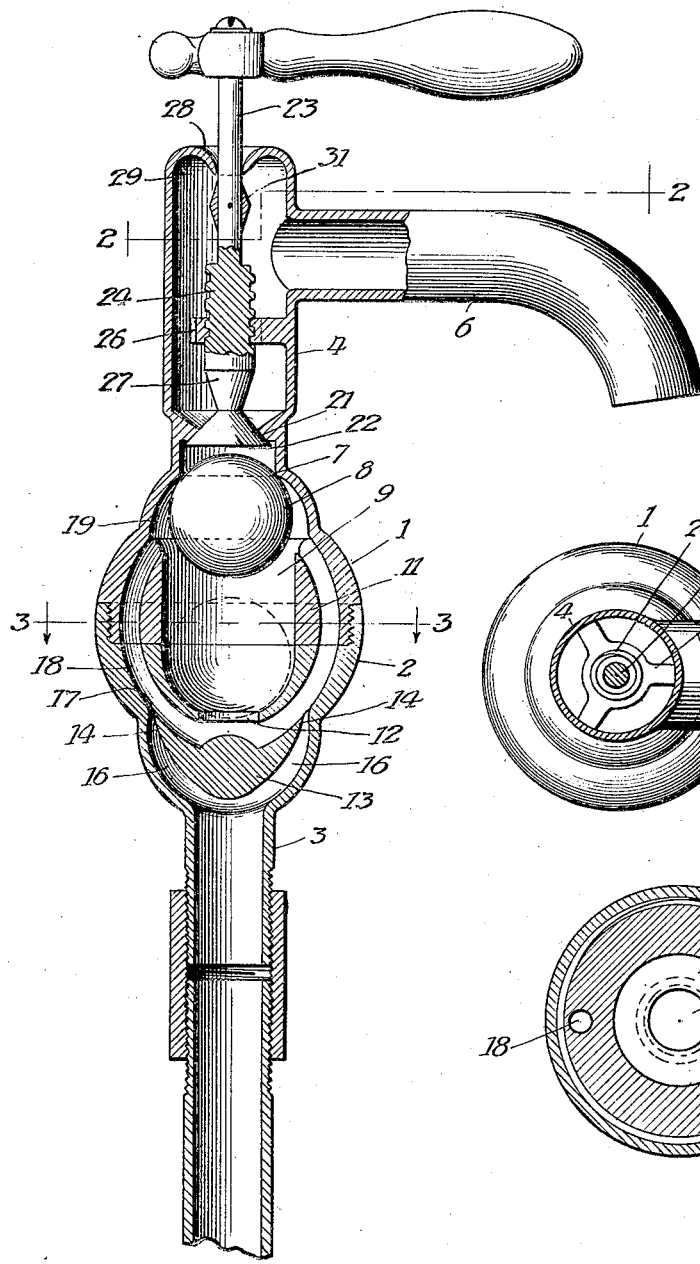
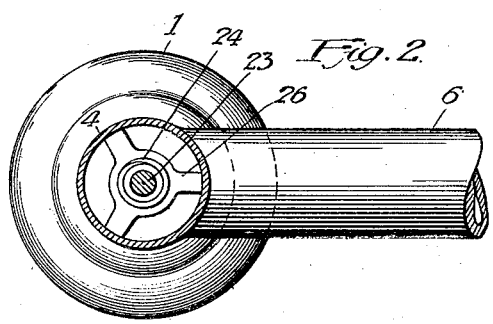
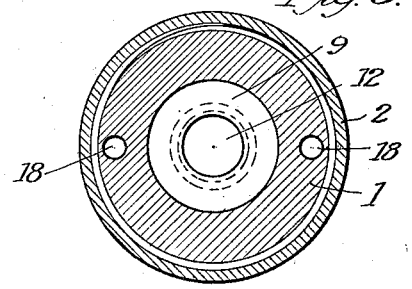
Inventor
John O. Barce
By Wilson, Dowell, McCanna & Rehm
Attys
Witness
R. B. Davison Patented Aug. 23, 1932

1,873,260

UNITED STATES PATENT OFFICE

JOHN O. BARCE, OF CHICAGO, ILLINOIS

VALVE

Application filed December 19, 1929. Serial No. 415,150.

This invention relates to valves and particularly to that type employing a ball seat.

In valves employing a ball as a seating element it is desirable to leave the ball free in order that it may rotate and present a constantly changing seat. This prevents grooving of the ball and maintains the ball perfectly round by allowing the ball to present a new seat at each operation. The accompanying difficulty with a freely suspended ball, however, is that in its open position it is free to chatter and vibrate and thus create undue noises in the valve.

It is the purpose of this invention to provide a valve employing a freely suspended ball as the seating element and in which the ball is controlled when unseated to prevent any chattering thereof.

Another common difficulty in a valve is the leakage which usually occurs around the valve stem where it projects through the valve body or bonnet. Heretofore it has been customary to pack the valve stem to prevent this leakage. Such packing, however, generally requires frequent attention and replacement in order that there be no leakage around the stem where it projects through the body.

It is also a purpose of this invention to provide a valve in which the leakage around the stem is eliminated.

According to this invention the valve body is provided with a chamber for the reception of the ball when it is unseated for retaining and controlling the ball out of the flow of fluid through the valve. It is preferred to retain and control the ball while in the ball chamber by creating a vacuum therein for retaining the ball in the chamber while the fluid is passing through the valve. It is convenient to use the flow of fluid through the valve for this particular purpose. Means are also provided for breaking the vacuum and permitting the ball to assume its seating position and to be held therein by the pressure of the fluid in the valve. In the preferred form of this invention means are provided for creating a water hammer to break the vacuum in the ball chamber and to dislodge the ball from its retracted position in the ball chamber and to drive it up into seating position.

In order to eliminate the usual leakage around the valve stem the inner surface of the valve body surrounding the aperture through which the stem projects is formed in such a manner as to direct the flow of any water which should reach that portion, away from the stem and in a direction to create a suction around the stem where it passes through the body rather than an outwardly exerted pressure. A better understanding will be had of this invention from the following description taken in connection with the drawing in which:

Fig. 1 is a vertical longitudinal section through the center of a valve constructed in accordance with this invention.

Fig. 2 is a section on line 2—2 of Fig. 1, and

Fig. 3 is a section on line 3—3 of Fig. 1.

The valve comprises a body formed of two sections, 1 and 2, threaded together along a horizontal plane. The two sections are circular in cross section and are of greater diameter at the line of jointure than at the ends thus presenting a somewhat bulbous configuration. The lower section 2 terminates in an inlet nipple 3 and the upper section 1 is formed with an integral bonnet 4 for housing the valve stem and valve actuating mechanism later to be described. The bonnet is provided with the usual outlet spout 6. Adjacent the upper end of the body portion 1 and approximately where the bonnet 4 joins thereto, the body is formed with an annular valve seat 7 adapted to be closed by a valve ball 8. Immediately below the ball 8 the body is formed with a ball chamber 9 of cylindrical formation defined by an annular wall 11, the chamber being open at its upper end and in position to receive the ball 8. The lower end of wall 11 is formed with a reduced opening 12 of lesser diameter than the diameter of the ball. Below the aperture 12 the body is formed with a baffle or deflector 13 disposed symmetrically with respect to the inlet 3 and having wing portions 14 approaching the sides of the housing to form passages 16 terminating in jets 17. The jets 17 enter into two circular channels or ducts 18, one passing up along each side of the wall 11 of the ball chamber and leading to an annular chamber 19 immediately above the open end of the ball chamber 9. The relation of the jets 17 with respect to channels 18 is such as to create an ejection action in the lower portions of channels 18 which will tend to create a suction or partial vacuum in the chamber 9.

Immediately above the valve seat 7 the bonnet 4 is provided with a restricted passage or port 21 adapted to be partially or totally closed by the tapered portion 22 of the valve stem 23. The valve stem 23 is provided with an integral worm 24 engaging a worm nut 26 cast integrally with the bonnet. It will be seen that when the valve stem 23 is in its upward position the tapered portion 22 thereof will close or at least partially close the restricted opening 21. Immediately above the tapered portion 22 the stem is provided with a second tapered portion 27 of a maximum diameter slightly less than the diameter of the opening 21. It will be seen from the above that when the valve stem 23 is turned vertically downward that the portion 22 will move away from the restricted opening 21, whereas the portion 27 of the stem will move toward the restricted opening 21 to restrict the flow therethrough but being smaller than the opening will never entirely stop the flow.

In order to prevent leakage around the stem where it passes through the bonnet and to eliminate the necessity of packing and packing nuts, the upper end of the bonnet is curved inwardly and downwardly as at 28 thus providing an annular concave inner surface surrounding the stem 23. The stem 23 is provided with a deflector 31 within the bonnet and immediately below the inner edge of the surface 29. As will be observed the deflector is of greater diameter at its center than at its ends.

In operation the valve functions as follows:

In the normal closed condition of the valve the stem 23 is up and the portion 22 thereof totally or partially closes the opening 21 i. e. the portion 22 need not seal the opening tightly. Under this condition the valve ball 8 will be seated against seat 7 and be held tightly thereagainst by the pressure of the fluid, such as water, pressing against the lower surface thereof. To open the valve the stem 23 is turned downwardly until the lower end thereof contacts with ball 8 and pushes the same downwardly into chamber 9. With the ball 8 removed from its seat 7 fluid such as water entering the inlet 3 may flow through the valve and is directed upwardly into the two channels 16 by the baffle 13 and through the jets 17 into the enlarged circular channels 18. As the water passes through the jets 17 and into the larger channels 18, a suction is created in the lower portions of channels 18 below the jets and any water which may have been lying in the chamber 9 will be drawn out through aperture 12 and into channels 18 and the ball will be sucked downwardly. After all water has been withdrawn, a partial vacuum will be created in chamber 9 and retain ball 8 in the lower portion of chamber 9 where it will seal the opening 12. The water passing through channels 18 will enter into the passage 19, pass through the opening 21 up into the bonnet and out through the spout 6. Once the ball has been dislodged by the stem, the flow through the restricted opening 21 may be controlled by adjusting the stem 23 and the portion 27 thereof toward or away from the opening 21.

The ball 8 being held down in chamber 9 out of the flow of liquid and under the action of the partial vacuum created by jet 17 will not rattle or vibrate.

With the valve in its open condition the valve may be closed by running stem 23 upwardly until portion 22 substantially closes the opening 21. When the portion 22 substantially closes the opening 21 there will be created a water hammer which will cause the water to surge suddenly downwardly through channels 18 and back upwardly through the opening 12, the flow thereof being aided by the upper curved portion of the baffle 13. The water flowing in this reversed direction will impart a sudden impact to the ball 8 and drive it upwardly against its seat 7 where it will be held by the pressure of the incoming water.

From the foregoing description it will be apparent that the stem 23 and the head at its end perform a dual function, i. e., the end surface of the stem serves to dislodge the ball from its seated position whereas the tapered closing portion serves to diminish the flow through the valve and cause a hammer action to break the vacuum holding the ball down in its lower position. When the valve is closed the bonnet is not subjected to the pressure of the upstream side and there is no tendency for the bonnet to leak where the stem passes through. When in open position the outlet 6 being free and open to atmosphere, and the point of passage of the stem through the bonnet being out of the path of flow through the valve the water will flow directly from the bonnet through the outlet and there will be very little tendency for the water to seep out around the stem 23 where it passes through the bonnet. Any water, however, which does reach the upper end of the bonnet will strike the concaved surface 29 and be deflected downwardly and again outwardly by the deflector 31 thus creating a suction around the stem 23 where it passes through the bonnet. The upper portion of deflector 31 will also serve to direct any water which would tend to pass upwardly along the stem outwardly toward the concaved surface 29 where it will be deflected downwardly as previously described.

It follows from the above that there is provided a valve employing a freely disposed ball as a seating element and in which the ball is controlled in a chamber out of the flow of fluid in such a manner that it is impossible for it to vibrate and create unnecessary noises. This control is accomplished without the use of other moving parts, being brought about by a diversion of the water in such a manner as to create a suction or partial vacuum. The valve employs exceedingly few parts and can be manufactured at simple cost with very few machining operations.

Other advantages will be apparent from the foregoing description.

It is obvious that minor changes may be made in the details of construction without departing from the spirit of the invention as defined by the claims appended hereto.

I claim:

1. In a valve, a valve body having a valve seat therein, a ball chamber below said valve seat, a ball freely disposed in said chamber adapted to close said seat when in one position, means for dislodging said ball from said seat and means for creating a vacuum in said chamber to retain said ball in its dislodged position.

2. In a valve, a valve body having a valve seat therein, a ball chamber below said valve seat, a ball freely disposed in said chamber adapted to close said seat when in one position, means for dislodging said ball from said seat, means for creating a vacuum in said chamber to retain said ball in its dislodged position and means for causing the restoration of said ball to its seat.

3. In a valve, a valve body having a valve seat therein, a ball chamber below said valve seat, a ball freely disposed in said chamber adapted to close said seat when in one position, means for dislodging said ball from said seat, means for creating a vacuum in said chamber to retain said ball in its dislodged position and means for breaking said vacuum and causing the restoration of said ball to its seat.

4. In a valve, a valve body having a valve seat therein, a ball chamber below said valve seat, a ball freely disposed in said chamber adapted to close said seat when in one position, means for dislodging said ball from said seat, means for creating a vacuum in said chamber to retain said ball in its dislodged position and means for creating a water hammer to cause the fluid controlled by the valve to return said ball to its seat.

5. In a valve, a valve body having a valve seat and a ball chamber therein below said seat, said chamber having an aperture therein, a ball freely disposed in said chamber and adapted to close said seat when in one position under pressure of the fluid flowing into said valve, means for dislodging said ball from its seat against the pressure of the fluid and means for directing the flow of fluid past said chamber to create a vacuum therein.

6. In a valve, a valve body having a valve seat and a ball chamber therein below said seat, said chamber having an aperture therein, a ball freely disposed in said chamber and adapted to close said seat when in one position under pressure of the fluid flowing into said valve, means for dislodging said ball from its seat against the pressure of the fluid, means for directing the flow of fluid past said chamber to create a vacuum therein and means for breaking said vacuum.

7. In a valve, a valve body having a valve seat and a ball chamber therein below said seat, said chamber having an aperture therein, a ball freely disposed in said chamber and adapted to close said seat when in one position under pressure of the fluid flowing into said valve, means for dislodging said ball from its seat against the pressure of the fluid, means for directing the flow of fluid past said chamber to create a vacuum therein and means for creating a water hammer to break said vacuum and cause the fluid controlled by the valve to return said ball to its seat.

8. In a valve, a valve body having a valve seat therein, a restricted passage above said seat and a ball chamber below said seat and opening toward the seat, said chamber also having a restricted opening in the bottom thereof, a ball freely disposed in said chamber arranged to close said seat under pressure of the fluid, means for dislodging said ball against the pressure of said fluid and means for diverting the fluid past said chamber to create a vacuum therein to retain the ball in the chamber after being dislodged.

9. In a valve, a valve body having a valve seat therein, a restricted passage above said seat and a ball chamber below said seat and opening toward the seat, said chamber also having a restricted opening in the bottom thereof, a ball freely disposed in said chamber arranged to close said seat under pressure of the fluid, means for dislodging said ball against the pressure of said fluid, means for diverting the fluid past said chamber to create a vacuum therein to retain the ball in the chamber after being dislodged and means for breaking said vacuum.

10. In a valve, a valve body having a valve seat therein, a restricted passage above said seat and a ball chamber below said seat and opening toward the seat, said chamber also having a restricted opening in the bottom thereof, a ball freely disposed in said chamber arranged to close said seat under pressure of the fluid, means for dislodging said ball against the pressure of said fluid, means for diverting the fluid past said chamber to create a vacuum therein to retain the ball in the chamber after being dislodged and means for closing said opening above said valve seat sufficiently to create a water hammer to drive said ball upwardly in said chamber.

11. In a valve, a valve body having a valve seat therein, a restricted passage above said seat and a ball chamber below said seat and opening toward said seat, said chamber also having a restricted opening in the bottom thereof, a ball freely disposed in said chamber and arranged to close said seat under pressure of the fluid, an operating stem extending into said casing and through said restricted opening above said seat for dislodging said ball against the pressure of the fluid and means on said stem for partially closing said seat and means for diverting the fluid past said chamber to create a vacuum therein to retain the ball in said chamber after being dislodged.

12. In a valve, a valve body having a valve seat therein, a restricted passage above said seat and a ball chamber below said seat and opening toward said seat, said chamber also having a restricted opening in the bottom thereof, a ball freely disposed in said chamber and arranged to close said seat under pressure of the fluid, an operating stem extending into said casing and through said restricted opening above said seat for dislodging said ball against the pressure of the fluid, means on said stem for partially closing said seat and means for diverting the fluid past said chamber to create a vacuum therein to retain the ball in said chamber after being dislodged, said stem also having a portion thereon adapted to partially close the restricted opening above said seat to control the flow therethrough when said valve is open.

13. In a valve, a valve body having a valve seat therein, a restricted passage above said seat and a ball chamber below said seat, said chamber being out of the flow of fluid through the valve and opening toward said seat and having a restricted opening in the bottom thereof, a ball freely disposed in said chamber and arranged to close said seat under pressure of the fluid, means for dislodging said ball against the pressure of said fluid and means for diverting the fluid past said chamber to create a vacuum therein to retain the ball in said chamber after being dislodged.

14. In a valve, a valve body having a valve seat therein, a restricted passage above said seat and a ball chamber below said seat, said chamber being out of the flow of fluid through the valve and opening toward said seat and having a restricted opening in the bottom thereof, a ball freely disposed in said chamber and arranged to close said seat under pressure of the fluid, means for dislodging said ball against the pressure of said fluid, means for diverting the fluid past said chamber to create a vacuum therein to retain the ball in said chamber after being dislodged and means for creating a water hammer back through the opening in the bottom of said chamber to cause the water to raise the ball into seating position.

15. In a valve, a valve body, a valve within said body, an operating stem extending through said body for actuating said valve, the inner surface of the body surrounding said stem being concave in cross section and a deflector on said stem adjacent said concave surface for directing the fluid away from said stem.

16. In a valve, a valve body having a bonnet portion having an aperture therein, a valve within said body, an operating stem extending through said aperture in said bonnet portion, the inner surface of the bonnet portion adjacent said aperture therein being concave and a deflector on said stem adjacent said concave surface for directing the water away from said aperture.

In witness of the foregoing I affix my signature.

JOHN O. BARCE.